United States Patent
Kim et al.

(10) Patent No.: US 8,270,331 B2
(45) Date of Patent: Sep. 18, 2012

(54) APPARATUS AND METHOD FOR CHANGING A MULTICAST AND BROADCAST SERVICE (MCBCS) BROADCASTING CHANNEL IN A BROADBAND WIRELESS ACCESS SYSTEM

(75) Inventors: Jun-Hyung Kim, Suwon-si (KR); Nae-Hyun Lim, Seoul (KR); Jae-Jeong Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1186 days.

(21) Appl. No.: 12/039,655

(22) Filed: Feb. 28, 2008

(65) Prior Publication Data

US 2008/0212529 A1 Sep. 4, 2008

(30) Foreign Application Priority Data

Mar. 2, 2007 (KR) .................. 10-2007-0020812

(51) Int. Cl.
  *H04H 20/71* (2008.01)
(52) U.S. Cl. ........ 370/312; 370/322; 370/390; 455/450; 455/509
(58) Field of Classification Search .................. 370/312, 370/322, 329, 348, 390; 455/434, 450–452.2, 455/455, 509, 511, 516; 709/227–229
See application file for complete search history.

(56) References Cited

U.S. PATENT DOCUMENTS

| | | | |
|---|---|---|---|
| 6,266,332 B1 | 7/2001 | Koivu | |
| 6,701,155 B2* | 3/2004 | Sarkkinen et al. | 455/515 |
| 7,113,484 B1 | 9/2006 | Chapman et al. | |
| 7,852,794 B2* | 12/2010 | Venkatachalam | 370/312 |
| 2005/0172314 A1 | 8/2005 | Krakora et al. | |
| 2007/0086380 A1* | 4/2007 | Lim et al. | 370/329 |
| 2008/0008176 A1* | 1/2008 | Lim et al. | 370/390 |
| 2008/0037460 A1* | 2/2008 | Venkatachalam | 370/328 |
| 2008/0253322 A1* | 10/2008 | So et al. | 370/329 |
| 2009/0103467 A1* | 4/2009 | Barber et al. | 370/312 |
| 2009/0190518 A1* | 7/2009 | Kim et al. | 370/312 |
| 2010/0278091 A1* | 11/2010 | Sung et al. | 370/312 |

* cited by examiner

*Primary Examiner* — Habte Mered
(74) *Attorney, Agent, or Firm* — Jefferson IP Law, LLP

(57) ABSTRACT

An apparatus and a method for changing a MultiCast and BroadCast Service (MCBCS) broadcasting channel in a Broadband Wireless Access (BWA) system are provided. The method includes, if an MCBCS initialization request message is received from an MCBCS server, sending a burst reservation request message for MCBCS burst allocation to one or more Base Stations (BSs) in a corresponding Multicast and Broadcast Service (MBS) zone, and if a burst reservation response message is received from at least one of the one or more BSs, sending a Resource Reservation (RR) request message for each channel to the at least one of the one or more BSs for establishing data channels for each channel broadcast by the MCBCS server. Accordingly, a channel transition delay time resulting from a user's channel change can be reduced.

23 Claims, 7 Drawing Sheets

APPARATUS AND METHOD FOR CHANGING A MULTICAST AND BROADCAST SERVICE (MCBCS) BROADCASTING CHANNEL IN A BROADBAND WIRELESS ACCESS SYSTEM

PRIORITY

This application claims the benefit under 35 U.S.C. §119(a) of a Korean patent application filed in the Korean Intellectual Property Office on Mar. 2, 2007 and assigned Serial No. 10-2007-0020812, the entire disclosure of which is hereby incorporated by reference.

BACKGROUND OF THE INVENTION

1. Field of the Invention

The present invention relates to an apparatus and a method for changing a MultiCast and BroadCast Service (MCBCS) broadcasting channel in a Broadband Wireless Access (BWA) system. More particularly, the present invention relates to an apparatus and a method for presetting multiple MCBCS connections, as many as the number of channels in an MCBCS initialization process, to reduce a time delay associated with a channel change of a user.

2. Description of the Related Art

In the past, communication systems were developed with an emphasis on providing voice services. However, with the evolution of communication systems the emphasis has shifted to providing data services and various multimedia services as well as voice services. Voice oriented communication systems have not satisfied users' service needs because of their relatively narrow transmission bandwidths and expensive fees. Additionally, advances in the communication industry and users' increasing demand for Internet service has raised the need for communication systems that efficiently provide Internet services. In response to this demand, a Broadband Wireless Access (BWA) system is presented with enough capacity to meet the users' increasing demand for an efficiently provided Internet service.

The BWA system integrally supports not only voice services, but also multimedia application services such as various low-speed and high-speed data services and high-definition video services. The BWA system is a radio communication system capable of accessing a Public Switched Telephone Network (PSTN), a Public Switched Data Network (PSDN), the Internet, an International Mobile Telecommunications (IMT)-2000 network, and an Asynchronous Transfer Mode (ATM) network in a mobile or stationary environment based on radio medium using the frequency bands of 2 GHz, 5 GHz, 26 GHz, and 60 GHz, and supporting a channel transfer rate over 2 Megabits per second (Mbps). The BWA system may be classified as a broadband wireless subscriber network, a broadband mobile access network, and a high-speed wireless Local Area Network (LAN) based on the mobility of a terminal (stationary or mobile), the communication environment (indoor or outdoor), and the channel transfer rate.

The radio access scheme of the BWA system is standardized by the Institute of Electrical and Electronics Engineers (IEEE) 802.16 Working Group, which is an international standardization organization. Compared to a conventional radio technique for voice services, the IEEE 802.16 standard allows for the transfer of large amounts of data within a short time using a wide data bandwidth and allows all users to efficiently share and utilize the channel (or resource). Also, with Quality of Service (QoS) guaranteed, the users can enjoy services having different service qualities according to service characteristics.

An IEEE 802.16 system has a MultiCast and BroadCast Service (MCBCS) specification for providing multicast and broadcast services to a plurality of mobile terminals. The MCBCS specification allows for operation within the same multicast and broadcast service area by using different Connection IDentifiers (CIDs) or different Security Associations (SAs). A Multicast and Broadcast Service (MBS) zone (MBS_ZONE) indicates a region where broadcast and multicast services are operating by means of the CID and the SA. A Base Station (BS) broadcasts MBS zone information using a Downlink Channel Descriptor (DCD) message. Namely, the MBS zone is a BS group using the same CID and SA to transmit content.

As such, the 802.16 system can provide the MCBCS service to provide multicast and broadcast services. The MCBCS service is divided into a single-BS access and a multi-BS access mode of operation based on the service access method of a Mobile Station (MS). In the single-BS access mode of operation, the MS receives the MCBCS service from a single BS to which the MS is registered. In the multi-BS access mode of operation, the MS receives the MCBCS service from two or more BSs at the same time.

According to the multi-BS access mode of operation, when the MS travels into a region in which the current service cell overlaps with a neighbor cell, a signal of the neighbor cell acts as a signal gain through an RF combining process, rather than a noise by interference. This is the macro diversity effect. However, to acquire the macro diversity effect, a signal sent from the serving BS and a signal sent from the BS of the neighbor cell must be the same. Accordingly, to provide the MCBCS service, all of BSs in the MBS zone should transmit the signals at the same time.

The MCBCS service is expected to be one of the more vital services in establishing the prevalence of the mobile Internet. In a broadcasting service such as the MCBCS, one of the crucial service elements is a channel transition delay time. Herein, the channel transition delay time indicates a time taken for the user to change from a current channel to another channel, which starts when the user selects to change the channel and ends when the user views the requested channel.

According to a conventional channel transition method, the MS sends a channel transition request message to an MCBCS server for the channel change, and the MCBCS server triggers an Access Service Network-Gateway (ASN-GW) to control the BS to perform a Dynamic Service Deletion (DSD) process for the existing channel with the MS and to send a Multicast Connection ID (MCID) relating to the channel requested by the user to the MS through a Dynamic Service Add (DSA) process. Thus, the user can receive the broadcast in the changed channel. The conventional channel change method is subject to delay times, for example, the time taken for the MS to request the resource for sending a channel transition request message to the MCBCS server and to acquire a transmission right, the time taken to send the channel transition request message to the MCBCS server until a response is received, the time taken to establish the data path between the ASN-GW and the BS, and the time taken for the performance of the DSD and the DSA between the BS and the MS.

As discussed above, the conventional channel change method results in too much channel transition delay time. Therefore, what is needed is a method for reducing the channel transition delay time to provide the user with high-quality services.

SUMMARY OF THE INVENTION

An aspect of the present invention is to address at least the above mentioned problems and/or disadvantages and to provide at least the advantages described below. Accordingly, an aspect of the present invention is to provide an apparatus and a method for changing an MCBCS channel in a BWA system.

Another aspect of the present invention is to provide an apparatus and a method for presetting multiple MCBCS connections, as many as the number of channels in an MCBCS initialization process, to reduce a time delay associated with a channel change of a user in a BWA system.

The above aspects are addressed by providing a method for changing an MCBCS broadcasting channel in an Access Service Network-Gateway (ASN-GW) of a BWA system. The method includes, if an MCBCS initialization request message is received from an MCBCS server, sending a burst reservation request message for MCBCS burst allocation to one or more Base Stations (BSs) in a corresponding Multicast and Broadcast Service (MBS) zone, and if a burst reservation response message is received from at least one of the one or more BSs, sending a Resource Reservation (RR) request message for each channel to the at least one of the one or more BSs for establishing data channels for each channel broadcast by the MCBCS server.

According to one aspect of the present invention, a method for changing an MCBCS broadcasting channel in a BS of a BWA system is provided. The method includes receiving a burst reservation request message for MCBCS burst allocation from an Access Service Network-Gateway (ASN-GW) and sending a burst reservation response message to the ASN-GW, receiving a Resource Reservation (RR) request message for each channel from the ASN-GW for establishing data paths for each channel broadcast by an MCBCS server, and performing a Dynamic Service Add (DSA) process with a Mobile Station (MS) for establishing an MCBCS connection for each channel.

According to another aspect of the present invention, a method for changing an MCBCS broadcasting channel in an MCBCS server of a BWA system is provided. The method includes if an MCBCS service request message is received from a Mobile Station (MS), authenticating the MS, and when the authentication is complete, sending an MCBCS initialization request message to an Access Service Network-Gateway (ASN-GW) for establishing data paths and MCBCS connections for each channel broadcast by the MCBCS server.

According to yet another aspect of the present invention, an apparatus for changing an MCBCS broadcasting channel in a BWA system. The apparatus includes an Access Service Network-Gateway (ASN-GW) for, if an MCBCS initialization request message is received from an MCBCS server, sending a Resource Reservation (RR) request message for each channel to one or more Base Stations (BSs) in a corresponding Multicast and Broadcast Service (MBS) zone for establishing data paths for each channel broadcast by the MCBCS server, and the one or more BSs for, if the RR request message is received, performing a Dynamic Service Add (DSA) process for establishing an MCBCS connection for each channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for changing a MultiCast and BroadCast Service (MCBCS) broadcasting channel in a Broadband Wireless Access (BWA) system. In particular, exemplary embodiments of the present invention provide an apparatus and a method for presetting multiple MCBCS connections, as many as the number of channels in an MCBCS initialization, to reduce a channel transition delay time according to a channel change of a user. Hereinaftera Base Station (BS) may also be referred to as a Radio Access Station (RAS). In addition, an Access Service Network-Gateway (ASN-GW) may also be referred to as an Access Control Router (ACR)

Figure 1:
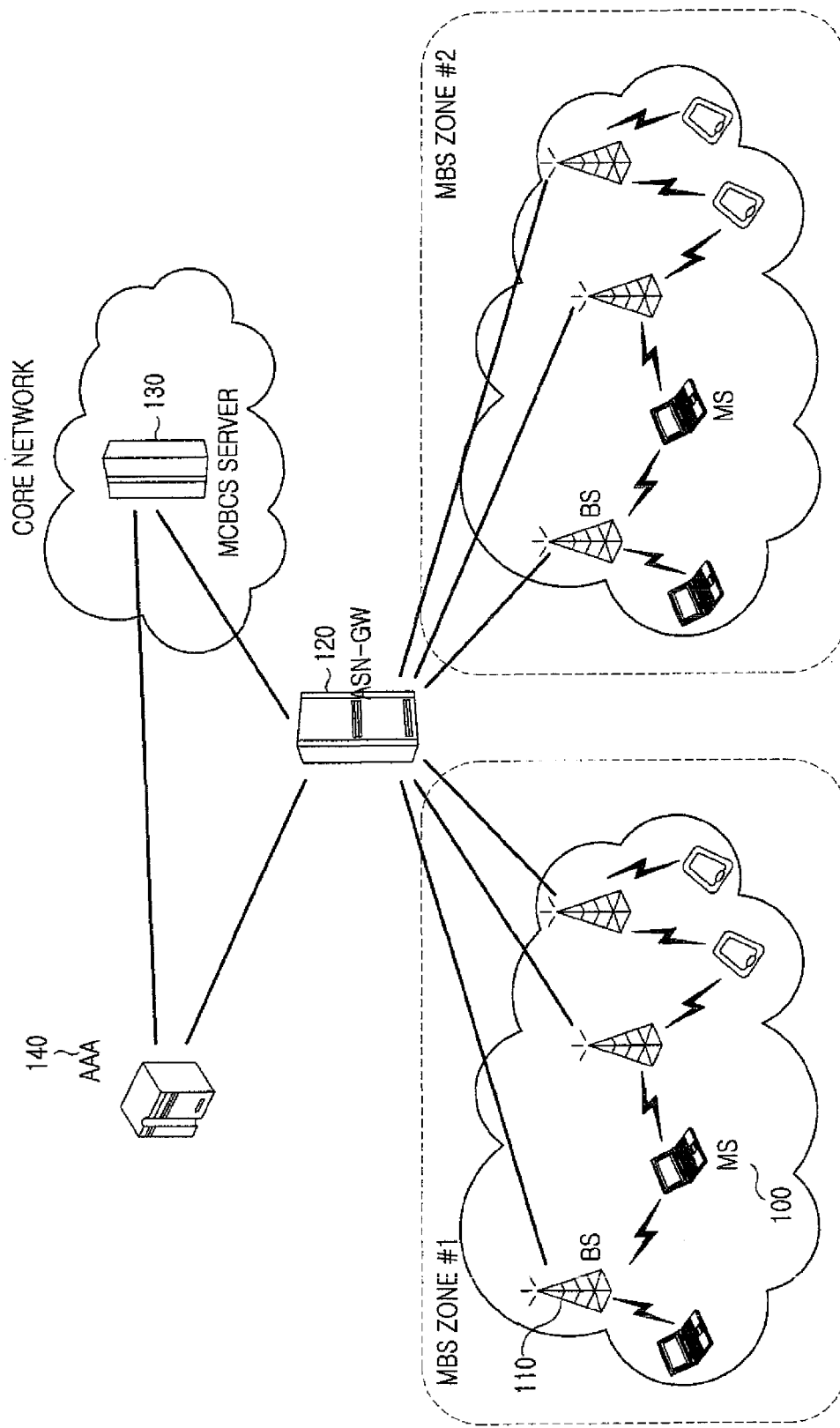
FIG. 1 is a diagram of a network structure for providing an MCBCS service in a BWA system according to an exemplary embodiment of the present invention.

FIG. 1 illustrates a network structure for providing an MCBCS service in a BWA system according to an exemplary embodiment of the present invention. The network structure of FIG. 1 includes an MCBCS server 130 of a core network, an Accounting Authentication Authorization (AAA) 140, an ASN-GW 120, a BS 110, and a Mobile Station (MS) 100.

The AAA 140 provides an accounting of charges and an authentication function for the MCBCS service.

The MCBCS server 130 manages and controls the MCBCS service, and transmits MCBCS content generated by a content provider to the MS 100 via the ASN-GW 120 and the BS 110. Also, the MCBCS server 130 manages a mapping table of Multicast Connection ID (MCID) versus multicast IP address, and transmits the mapping table to the corresponding MS 100 according to an MCBCS service request of the MS 100 so as to select a user's requested channel in the MS 100.

The ASN-GW 120 is in charge of packetization and time stamping, manages the connection and the mobility of the MS 100, and forwards the content received from the MCBCS server 130 to every BS 110 in the corresponding MBS zone. Also, the ASN-GW 120 establishes a data path for every channel broadcast by the MCBCS server 130 by transmitting a Resource Reservation (RR) request message to and receiving a RR response message from the BS 110 in the process of the MCBCS service initialization. In doing so, the RR request message transmission and the RR response message reception can be performed once per channel and repeated as many times as the number of the channels, or may be performed at the same time with respect to all of the channels.

The BS 110 provides the connection of the radio section to the MS 110 and forwards the content from the ASN-GW 120 to the MS 100. The BS 110 establishes an MCBCS connection by performing a Dynamic Service Add (DSA) process with the MS 100 with respect to every channel broadcast by the MCBCS server 130 in the MCBCS service initialization. The DSA process can be repeated as many times as the number of the channels by performing once per channel, or may be performed for all of the channels at the same time.

The MS 100 supports the Institute of Electrical and Electronics Engineers (IEEE) 802.16 standard and provides the MCBCS service to a user. Herein, the MS 100 receives the mapping table by requesting the MCBCS service to the MCBCS server 130 in the MCBCS service initialization, and sets the MCBCS connections with respect to the multiple channels broadcast by the MCBCS server 130 through the multiple DSA processes with the BS 110; that is, acquires the MCIDs corresponding to the multiple channels, and receives MCBCS bursts from the MCBCS server 130. In doing so, the application layer of the MS 100 sends the MCID mapped to the user's selected channel to the MAC layer using the received mapping table. The MAC layer decodes only MCBCS bursts corresponding to the MCID mapped to the selected channel among the decodable MCBCS bursts corresponding to the MCIDs, which are received from the BS 110, and provides the decoded MCBCS bursts to the application layer. The application layer of the MS 100 displays packets corresponding to a multicast Internet Protocol (IP) address mapped to the user's selected channel in a display.

As shown in FIG. 1, one MBS zone, for example, MBS ZONE #1, includes a plurality of the BSs 110. The BSs in the same MBS zone transmit the same broadcasting contents to the service terminal at the same time.

Figure 2:
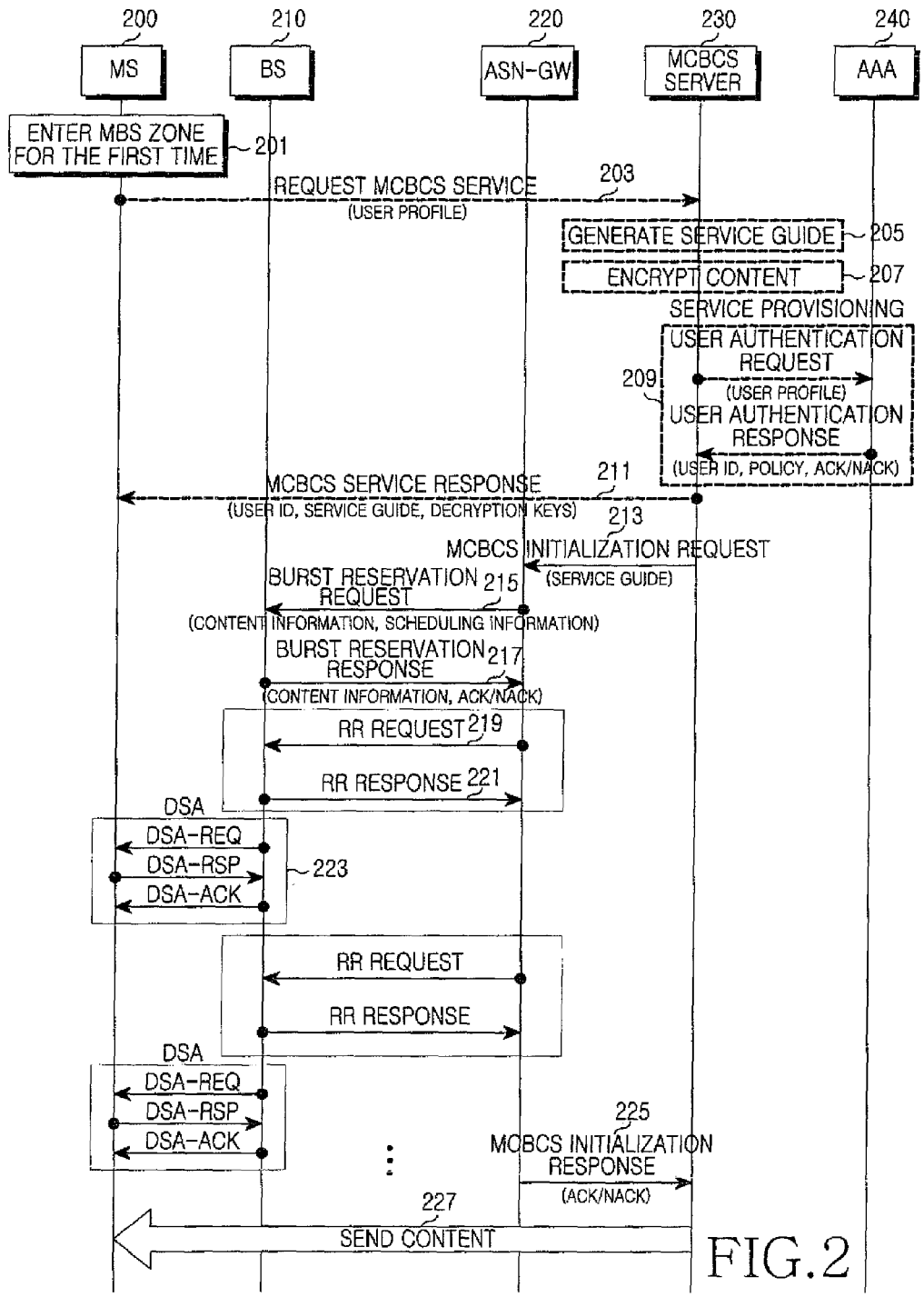
FIG. 2 is a diagram of an MCBCS service initialization process in a BWA system according to an exemplary embodiment of the present invention.

FIG. 2 illustrates an MCBCS service initialization process in a BWA system according to an exemplary embodiment of the present invention.

In a situation where there is no MS receiving the MCBCS service within a specific MBS zone which provides the MCBCS service, an MS 200 enters into the MBS zone in step 201. Herein, the MS 200 indicates a user; that is, a mobile terminal which enters the specific MBS zone for the first time, or a mobile terminal which requests the MCBCS service reception in the specific MBS zone for the first time.

In step 203, the MS 200 sends an MCSCB service request message to an MCBCS server 230. Herein, the MCBCS service request message includes user profile information containing the user's broadcasting service subscription information.

Upon receiving the MCBCS service request message, the MCBCS server 230 generates a service guide including broadcast schedule information and content information in step 205, and performs content protection on all content to be provided to the MS 200 in step 207. That is, the MCBCS server 230 may encrypt the content with an encryption key and manage decryption keys of the content. The steps 205 and 207 can be carried out before the user requests the MCBCS service.

In step 209, the MCBCS server 230 performs a service provisioning process for the service authentication of the user. More specifically, the MCBCS server 230 sends a user authentication request message including the user profile to the AAA 240, receives a user authentication response message from the AAA 240, and determines whether the corresponding user can normally receive the service. Herein, the user authentication response message includes user ID, authentication policy information for the accounting of charges, and ACK/NACK information relating to whether the service requesting terminal is a serviceable user.

When the service requesting terminal is a serviceable user, the MCBCS server 230 transmits an MCBCS service response message to the MS 200 in step 211. The MCBCS service response message includes the user ID, the service guide, and the content decryption keys for decrypting content. Also, the MCBCS service response message includes the mapping table to select the channel selected by the user.

The mapping table can be arranged as shown in Table 1.

TABLE 1

| Channel Description | Multicast IP address | MCID |
| --- | --- | --- |
| MBC news | mIP_addr_1 | mCID_FFA2 |
| KBS news | mIP_addr_2 | mCID_FFAA |
| ... | ... | ... |

In Table 1, the channel description describes a content name and a content description so that the user can confirm the corresponding channel or content. Each channel description is mapped with a multicast IP address and a MCID on a one-to-one basis. In more detail, one channel is one-to-one mapped to one content at a specific time, the channel is mapped to one multicast IP address, and the multicast IP address is mapped to one MCID. The user can select his/her desired channel based on the channel descriptions, the application program of the application layer in the MS can separate the corresponding contents using the multicast IP address, and the MAC layer of the MS can separate the corresponding content using the MCID.

In step 213, the MCBCS server 230 sends an MCBCS initialization request message to the ASN-GW 220. The MCBCS initialization request message includes the content information and the schedule information; that is, the service guide so that the ASN-GW 220 can allocate MCBCS bursts to the BS 210 in the corresponding MBS zone.

Receiving the service guide, the ASN-GW 220 sends a burst reservation request message for the MCBCS burst allocation to the BSs 210 in the corresponding MBS zone in step 215. The burst reservation request message includes the content information and the schedule information. Upon receiving the burst reservation request message, the BS 210 informs the ASN-GW 220 of whether the MCBCS burst allocation is possible by sending a burst reservation response message in step 217. The burst reservation response message includes the content information and ACK/NACK information relating to whether the burst allocation is possible or not.

In step 219, the ASN-GW 220, receiving the burst reservation response message informing of the possible MCBCS burst allocation from the BS 210, transmits an RR request message to the BSs 210 in the corresponding MBS zone to set data paths for the actual data transmission. The RR request message is a message for reserving the necessary resources for the data transmission. In step 221, the BS 210, receiving the RR request message, sends a RR response message to the ASN-GW 220 to establish a data path for a specific channel between the BS 210 and the ASN-GW 220. In step 223, the BS 210 performs the DSA process with the MS 200 to set the MCBCS connection for the MCBCS traffic transmission. More specifically, the BS 210 sends a DSA request (DSA-REQ) message to the MS 200 which requests the broadcasting service to send the MCID of the corresponding channel so that the MS 200 can decode the MCBCS bursts, and the MS 200 receiving the DSA-REQ message sends a DSA response (DSA-RSP) message to the BS 210. In response to the DSA-RSP message, the BS 210 sends a DSA acknowledgement (DSA-ACK) message to the MS 200.

Herein, the steps 219, 221, and 223 are conducted to set the data path and the MCBCS connection for one channel. Since one channel is mapped to one MCID as mentioned earlier, multiple data paths and MCIDs mapped to the channels are required to send the plurality of the channels. Accordingly, when the MCBCS server 230 broadcasts only two channels, the steps 219, 221, and 223 need to be repeated. Depending on the number of the channels broadcast by the MCBCS server 230, the number of the repetitions of the steps 219, 221, and 223 increases on a one-to-one basis.

The DSA process can be repeated as many times as the number of the channels by performing once per channel, or may be performed at same time in parallel with respect to all of the channels. For example, when there are ten channels, a DSA-ACK message transmitted for the first channel and then a DSA-REQ message is transmitted for the next channel. Alternatively, after DSA-REQ message for ten channels are transmitted in sequence, DSA-RSP messages for ten channels can be transmitted in sequence.

When the channel based connection settings between the ASN-GW 220 and the BS 210 and between the BS 210 and the MS 200 are completed, the ASN-GW 220 sends an MCBCS initialization response message to the MCBCS server 230 to inform of the completion of the broadcasting ready state in step 225. The MCBCS server 230 commences the content broadcasting to the MS 200 in step 227.

Meanwhile, the steps 205, 207, 215 and 217 may not be performed with respect to the user or the MS which enters the specific MBS zone after the first time; that is, the MS which requests the MCBCS service reception in the specific MBS zone after the first time.

Figure 3:
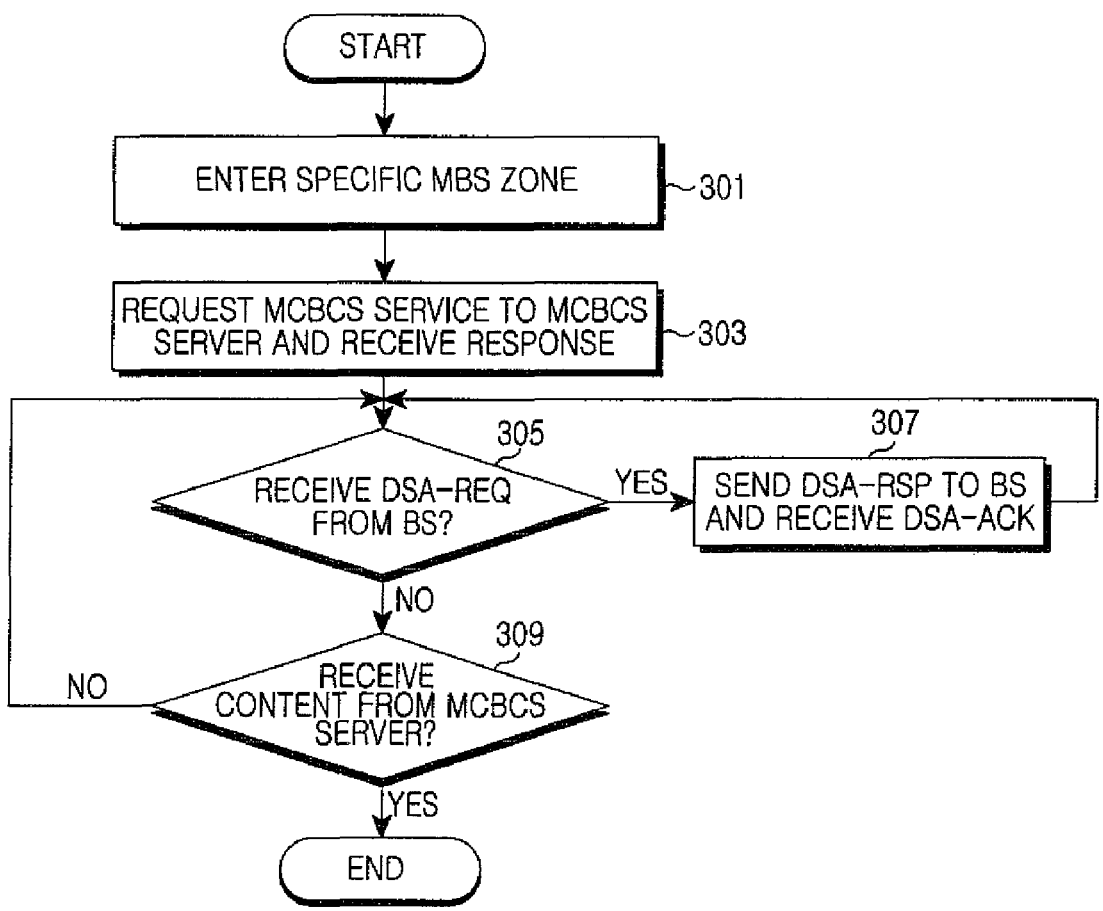
FIG. 3 is a flowchart of the MCBCS service initialization process of an MS in a BWA system according to an exemplary embodiment of the present invention.

FIG. 3 is a flowchart of the MCBCS service initialization process of the MS in a BWA system according to an exemplary embodiment of the present invention.

In step 301, the MS 100 enters the BS in a specific MBS zone. Herein, the MS 100 indicates a user or an MS which enters the specific MBS zone for the first time; that is, an MS which requests the reception of the MCBCS service in the specific MBS zone for the first time.

In step 303, the MS 100 sends an MCBCS service request message to the MCBCS server 130 and receives an MCBCS service response message from the MCBCS server 130. The MCBCS service request message includes the user profile information including the broadcast service subscription information of the user. The MCBCS service response message includes the user ID, the service guide, the content decryption keys for decrypting the content, and the mapping table for selecting the user's requested channel.

In step 305, the MS 100 determines whether a DSA-REQ message including the MCID mapped to a specific channel is received from the BS 110. When receiving the DSA-REQ message, the MS 100 sends a DSA-RSP message to the BS 110 in response to the DSA-REQ message and receives a DSA-ACK message from the BS 110 in response to the DSA-RSP message in step 307. Next, the process returns to step 305 to repeat the subsequent steps. Thus, the MS 100 can decode the MCBCS bursts using the MCID of the corresponding channel.

In contrast, when no DSA-REQ message is received from the BS 110, the MS 100 determines whether there is content received from the MCBCS server 130 in step 309. When no content is received, the process returns to step 305 and the subsequent steps are repeated as many times as the number of the channels broadcast by the MCBCS server 130. In contrast, upon receiving content, the MS 100 finishes the process.

Figure 4:
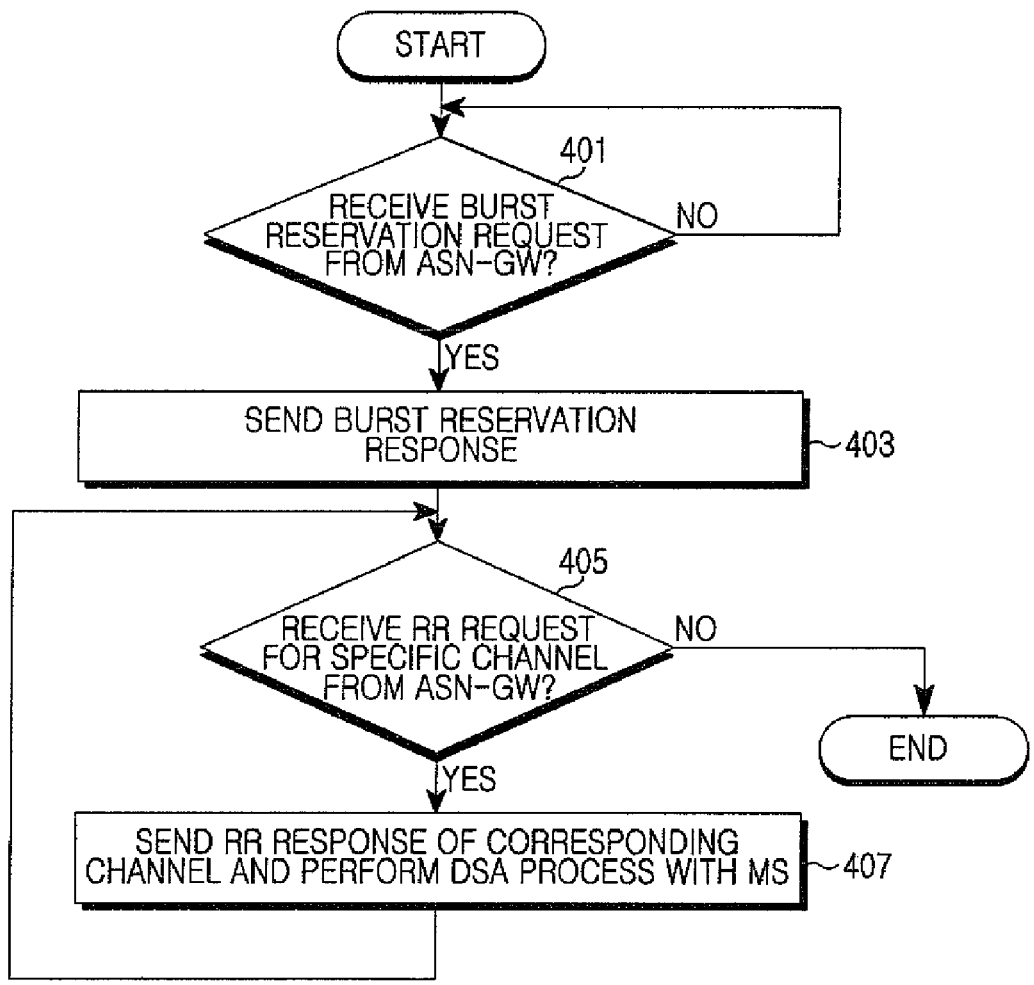
FIG. 4 is a flowchart of the MCBCS service initialization process of a BS in a BWA system according to an exemplary embodiment of the present invention.

FIG. 4 is a flowchart of the MCBCS service initialization process of the BS in the BWA system according to an exemplary embodiment of the present invention.

In step 401, the BS 110 determines whether a burst reservation request message for the MCBCS burst allocation is received from the ASN-GW 120. The burst reservation request message includes the content information and the schedule information. Upon receiving the burst reservation request message, the BS 100 sends a burst reservation response message to the ASN-GW 120 to inform of whether the MCBCS burst allocation is possible or not in step 403. The burst reservation response message includes the content information and the ACK/NACK information relating to whether the burst allocation is possible or not.

After transmitting the burst reservation response message informing of the possible MCBCS burst allocation to the ASN-GW 120, the BS 110 determines whether an RR request message for a specific channel is received from the ASN-GW 120 in step 405. If the RR request message is received, the BS 110 sends an RR response message for the corresponding channel to the ASN-GW 120 to set the data path for the data delivery between the BS 110 and the ASN-GW 120, and performs the DSA process with the MS 100 to set the MCBCS connection for the BMS traffic transmission in step 407. Next, the process returns to step 405 and the subsequent steps are repeated as many times as the number of the channels broadcast by the MCBCS server 130. More specifically, the BS 110 sends a DSA-REQ message to the MS 110 which requests the broadcast service, to provide the MCID of the corresponding channel so that the MS 100 can decode the MCBCS bursts, and receives a DSA-RSP message from the MS 100 in response. Next, the BS 110 sends a DSA-ACK message to the MS 100 in response to the DSA-RSP message.

In contrast, when no RR request message is received, the BS 110 determines that the data path and the MCBCS connection are set for every channel broadcast by the MCBCS server 130, and accordingly finishes the process.

Figure 5:
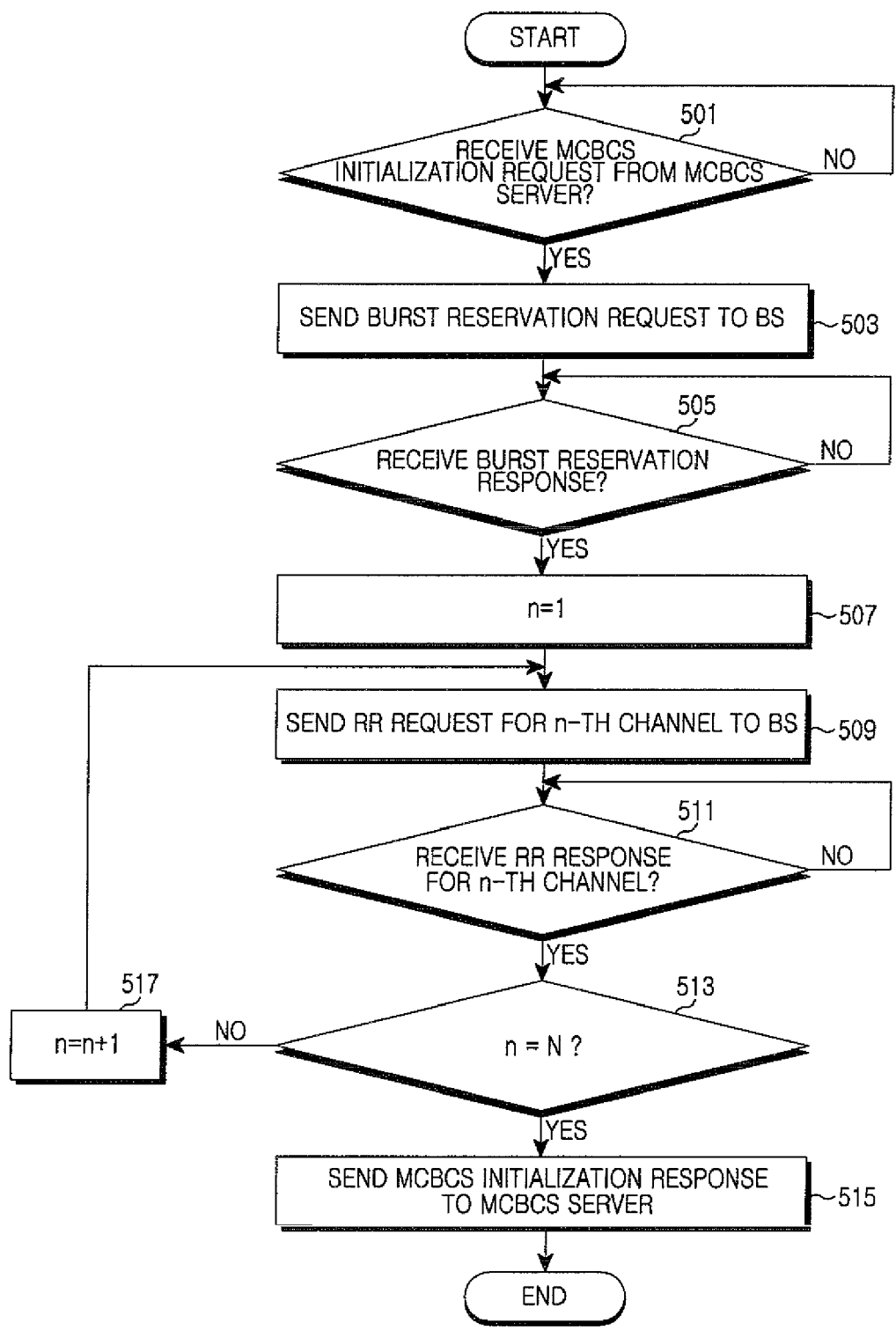
FIG. 5 is a flowchart of the MCBCS service initialization process of an ASN-GW in a BWA system according to an exemplary embodiment of the present invention.

FIG. 5 is a flowchart of the MCBCS service initialization process of the ASN-GW in a BWA system according to an exemplary embodiment of the present invention.

In step 501, the ASN-GW 120 determines whether an MCBCS initialization request message is received from the MCBCS server 130. The MCBCS initialization request message includes the content information and the schedule information; that is, the service guide so that the ASN-GW 120 can allocate the MCBCS bursts to the BS 110 in the corresponding MBS zone.

Upon receiving the MCBCS initialization request message, the ASN-GW 120 sends a burst reservation request message for the MCBCS burst allocation to the plurality of the BSs 110 in the corresponding MBS zone in step 503, and determines whether a burst reservation response message informing of the possible MCBCS burst allocation is received from the BS 110 in step 505. The burst reservation request message includes the content information and the schedule information, and the burst reservation response message includes the content information and the ACK/NACK information relating to whether the burst allocation is possible or not.

If the burst reservation response message is received, the ASN-GW 120 sets the channel index n to 1 in step 507 and sends an RR request message for the n-th channel to the BSs 110 in the corresponding MBS zone in step 509. The RR request message is transmitted to establish a data path of a specific channel to deliver actual data.

In step 511, the ASN-GW 120 determines whether an RR response message for the n-th channel is received from the BSs 110. If the RR response message is received, the ASN-GW 120 in step 513 determines whether n is N. N is the number of the channels broadcast by the MCBCS server 130. When n is different from N, the ASN-GW 120 updates n to n+1 in step 517 and the process returns to step 509 to repeat the subsequent steps. When n is N, that is, when the data path is completely set for every channel broadcast by the MCBCS server 130, the ASN-GW 120 sends an MCBCS initialization response message informing of the completion of the broadcasting ready state to the MCBCS server 130 in step 515 and finishes the process.

The MAC layer of the MS acquires the MCIDs corresponding to the plurality of the channels through the multiple DSA processes, and thus decodes all of the channels broadcast by the BS. Referring back to FIG. 2, the MAC layer of the MS acquires the MCIDs corresponding to the two channels and thus decodes each of the two channels broadcast by the BS 210. Now, the method for selecting the user's desired channel among the acquired MCIDs is described by referring to FIG. 6.

Figure 6:
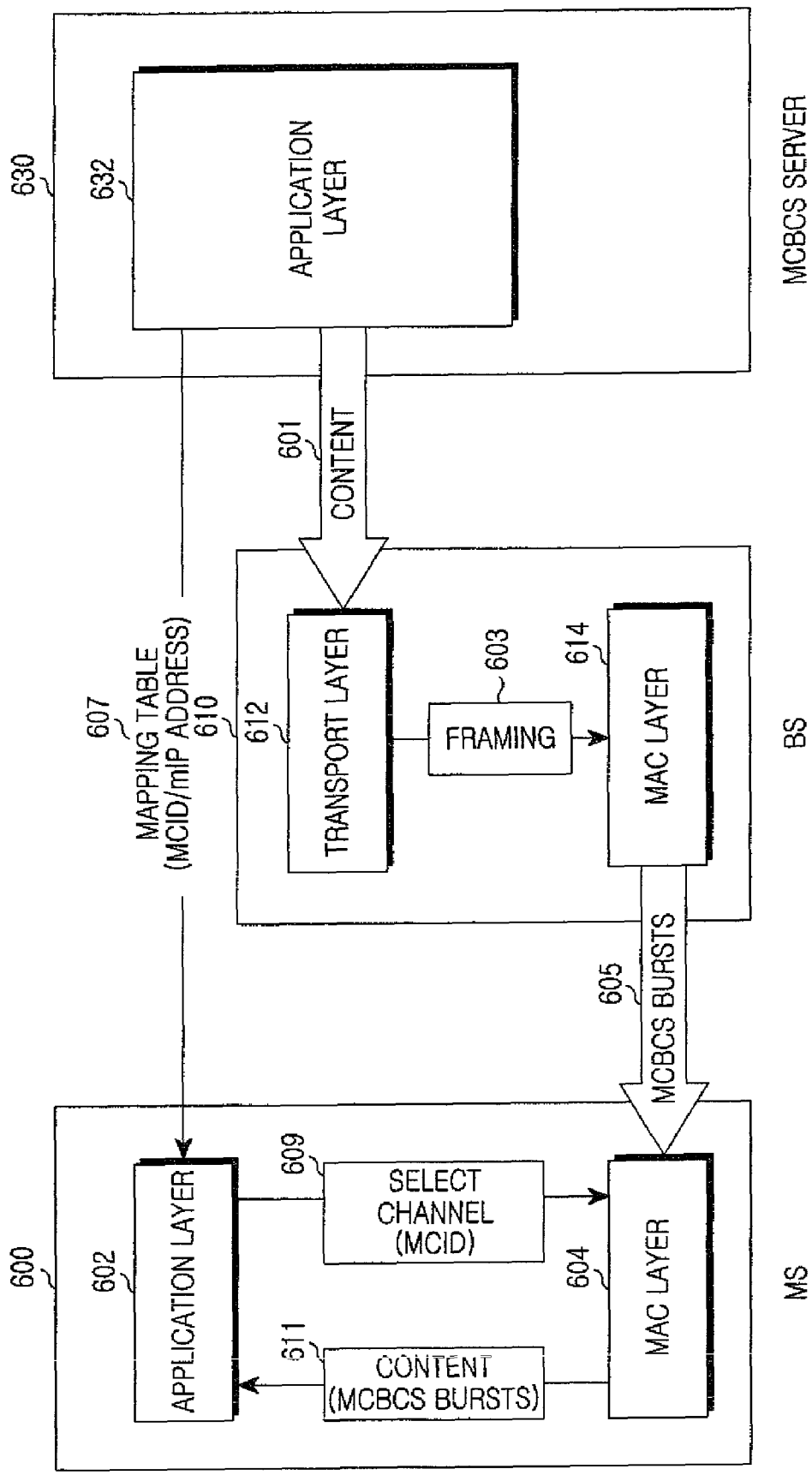
FIG. 6 is a diagram of a method for selecting a terminal user's intended channel in a BWA system according to an exemplary embodiment of the present invention.

FIG. 6 is a diagram of a method for selecting the terminal user's intended channel in a BWA system according to an exemplary embodiment of the present invention.

As for the MS which enters a specific MBS zone for the first time or the MS which requests the MCBCS service reception in the specific MBS zone for the first time, the application layer 602 of the MS 600 sends the MCBCS service request message to the application layer 632 of the MCBCS server 630 as in steps 203 and 211 of FIG. 2. In step 607, the application layer 602 receives the mapping table from the application layer 632 of the MCBCS server 630 using the MCBCS service response message. Herein, the mapping table pertains to the MCID versus the multicast IP address. The mapping table can be generated as shown in Table 1.

The MAC layer 604 of the MS 600 receives the content provided from the MCBCS server 630, through the BS 610 as in step 227 of FIG. 2. In step 601, the application layer 632 of the MCBCS server 630 transmits the content to the transport layer 612 of the BS 610 through the ASN-GW. Upon receiving the content, the transport layer 612 of the BS 610 schedules, frames and transmits the corresponding content to the MAC layer 614 according to the corresponding scheduling in step 603. The MAC layer 614 of the BS forwards the corresponding content to the MAC layer 604 of the MS 600 using the MCBCS bursts. Thus, the MS 600 can decode the content of every channel broadcast by the MCBCS server 630.

Next, the user of the MS 600 can select his/her desired channel based on the channel descriptions of the mapping table. In step 609, the application layer 602 of the MS 600 sends the MCID mapped to the selected channel to the MAC layer 604. The MAC layer 604 of the MS 600 acquires user's desired MCBCS bursts among the MCBCS bursts corresponding to the decodable MCIDs, decodes only the MCBCS bursts corresponding to the user's desired channel, and provides the decoded MCBCS bursts to the application layer 602 in step 611. The application program of the application layer 602 represents packets corresponding to the multicast IP address mapped to the channel description selected by the user.

As the MS which enters the specific MBS zone for the first time or the MS which requests to receive the MCBCS service in the specific MBS zone for the first time performs the above process, the corresponding MBS zone is broadcasting the MCBCS bursts. An MS which enters the corresponding MBS zone after the first time or an MS which requests the MCBCS service reception after the first time operates as if steps 601 through 605 have already been performed. In other words, since the MCBCS bursts are provided to the MAC layer 604 of the MS 600 upon the entrance, the steps 601 through 605 are unnecessary. Accordingly, the MS 600 which enters the MBS zone or requests the MCBCS service after the first time, receives the mapping table from the MCBCS server 630 by transmitting the MCBCS service request message and receiving the MCBCS service response message in step 607, and displays the received mapping table in the display. Next, when the user of the MS 600 selects his/her intended channel description in the mapping table, the application layer 602 of the MS 600 sends the MCID mapped to the user's selected channel to the MAC layer 604 in step 609, and receives the MCBCS bursts decoded for the user's selected channel from the MAC layer 604.

Figure 7:
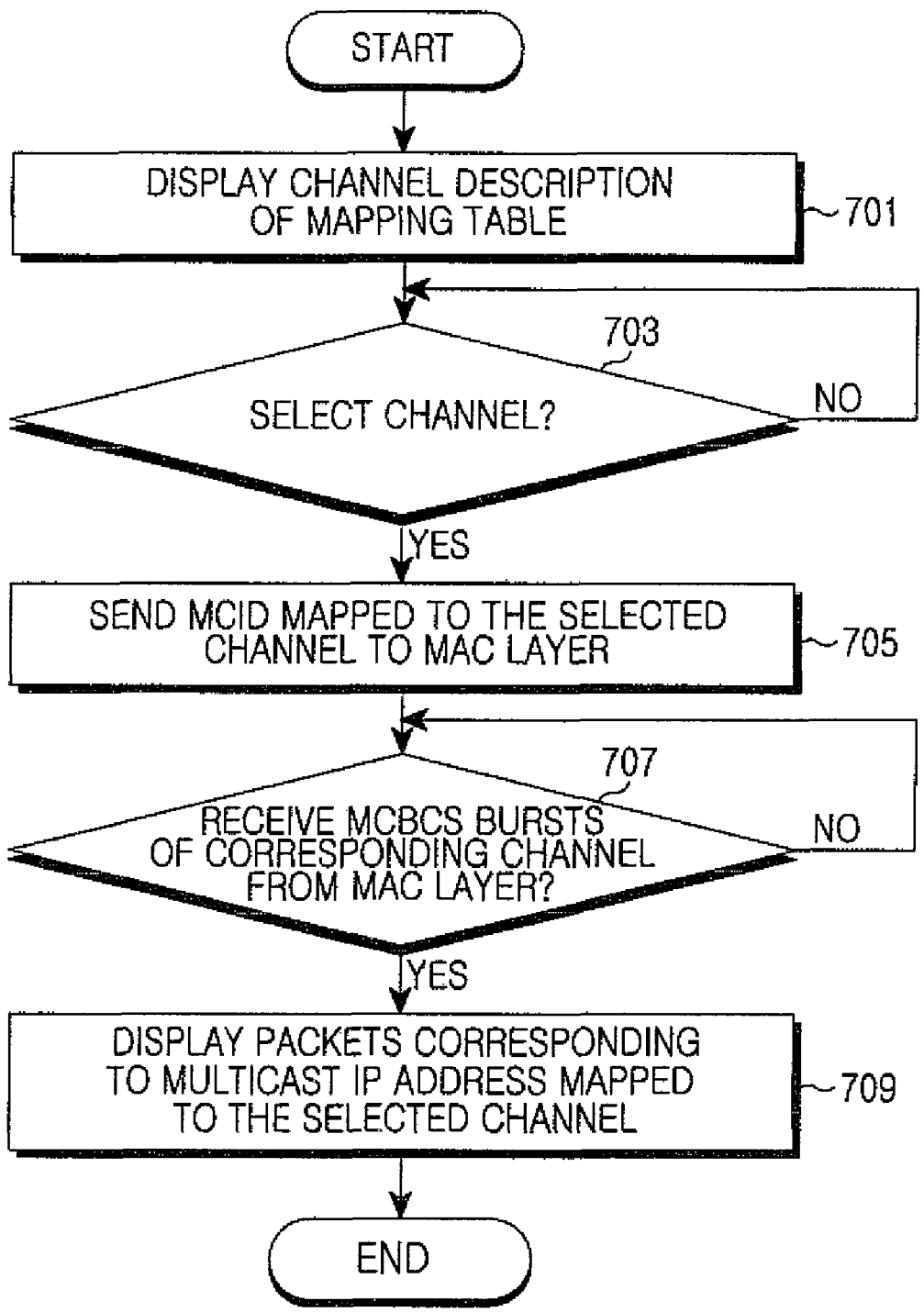
FIG. 7 is a flowchart of a method for an application layer of the terminal to select a user's intended channel in a BWA system according to an exemplary embodiment of the present invention.

FIG. 7 is a flowchart of a method for an application layer of the terminal to select a user's intended channel in the BWA system according to an exemplary embodiment of the present invention.

In step 701, the application layer 602 of the MS 600 displays the channel descriptions of the mapping table received from the MCBCS server 630 in a display. It is assumed that the MAC layer 604 of the MS 600 can decode the content of every channel broadcast by the MCBCS server 630.

In step 703, the application layer 602 of the MS 600 determines whether a particular channel is selected according to a user's key manipulation. When the particular channel is selected, the application layer 602 of the MS 600 sends the MCID mapped to the selected channel to the MAC layer 604 in step 705. Using the MCID, the MAC layer 604 of the MS 600 acquires the MCBCS bursts selected by the user among the MCBCS bursts corresponding to the decodable MCIDs, decodes only the corresponding MCBCS bursts, and provides the decoded MCBCS bursts to the application layer 602.

In step 707, the application layer 602 determines whether MCBCS bursts of the corresponding channel are received from the MBC layer 604. If the decoded MCBCS bursts of the corresponding channel are received, the application layer 602 of the MS 600 displays packets corresponding to the multicast IP address mapped to the user's selected channel in step 709 and then finishes this process.

As set forth above, by setting the multiple MCBCS connections, as many as the number of the channels in the MCBCS initialization, in advance in the BWA system, a channel transition delay time according to the user's channel change can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for changing a MultiCast and BroadCast Service (MCBCS) broadcasting channel in an Access Service Network-Gateway (ASN-GW) of a Broadband Wireless Access (BWA) system, the method comprising:
   if an MCBCS initialization request message is received from an MCBCS server, sending a burst reservation request message for MCBCS burst allocation to one or more Base Stations (BSs) in a corresponding Multicast and Broadcast Service (MBS) zone; and
   if a burst reservation response message is received from at least one of the one or more BSs, sending a Resource Reservation (RR) request message to the at least one of the one or more BSs for establishing data channels for multiple channels broadcast by the MCBCS server.

2. The method of claim 1, further comprising:
   receiving an RR response message from the at least one of the one or more BSs in response to the RR request message; and
   if the RR response message is received with respect to each of the channels, sending an MCBCS initialization response message to the MCBCS server.

3. The method of claim 1, wherein the RR request message is transmitted only once for each of the channels and is transmitted as many times as a number of the channels.

4. The method of claim 1, wherein the RR request messages for the multiple channels are transmitted at the same time.

5. A method for changing a MultiCast and BroadCast Service (MCBCS) broadcasting channel in a Base Station (BS) of a Broadband Wireless Access (BWA) system, the method comprising:
   receiving a burst reservation request message for MCBCS burst allocation from an Access Service Network-Gateway (ASN-GW) and sending a burst reservation response message to the ASN-GW;
   receiving a Resource Reservation (RR) request message from the ASN-GW for establishing data paths for multiple channels broadcast by an MCBCS server; and
   performing a Dynamic Service Add (DSA) process with a Mobile Station (MS) for establishing an MCBCS connection for each of the channels.

6. The method of claim 5, further comprising:
   sending an RR response message to the ASN-GW in response to the RR request message for each of the channels.

7. The method of claim 5, wherein the RR request message is received only once for each of the channels and is received as many times as a number of the channels.

8. The method of claim 5, wherein the RR request messages for each of the channels is received at the same time.

9. The method of claim 5, wherein the DSA process is performed only once for each of the channels and is repeated as many times as the number of the channels.

10. The method of claim 5, wherein the DSA processes for each of the channels are performed in parallel.

11. A method for changing a MultiCast and BroadCast Service (MCBCS) broadcasting channel in Broadband Wireless Access (BWA) system, the method comprising:
    if an MCBCS service request message is received from a Mobile Station (MS), authenticating the MS;
    when the authentication is complete, sending an MCBCS initialization request message to an Access Service Network-Gateway (ASN-GW) for establishing data paths and MCBCS connections for multiple channels broadcast by an MCBCS server; and
    when the MCBCS initialization request message is received, sending, by the ASN-GW, a burst reservation request message for MCBCS burst allocation to one or more Base Stations (BSs) before sending a Resource Reservation (RR) request message to the one or more BSs.

12. The method of claim 11, further comprising:
    if an MCBCS service request message is received from the MS, sending an MCBCS service response message comprising a service guide to the MS.

13. The method of claim 11, further comprising:
    if an MCBCS initialization response message is received from the ASN-GW, sending content of each of the channels through the established data paths and MCBCS connections.

14. An apparatus for changing a MultiCast and BroadCast Service (MCBCS) broadcasting channel in a Broadband Wireless Access (BWA) system, the apparatus comprising:
    an Access Service Network-Gateway (ASN-GW) for, if an MCBCS initialization request message is received from an MCBCS server, sending a Resource Reservation (RR) request message to one or more Base Stations (BSs) in a corresponding Multicast and Broadcast Service (MBS) zone for establishing data paths for multiple channels broadcast by the MCBCS server, and sending a burst reservation request message for MCBCS burst allocation to the one or more BSs before sending the RR request message; and
    the one or more BSs for, if the RR request message is received, performing a Dynamic Service Add (DSA) process for establishing an MCBCS connection for each of the channels.

15. The apparatus of claim 14, wherein the ASN-GW receives an RR response message from the one or more BSs in response to the RR request message, and sends an MCBCS initialization response message to the MCBCS server when the RR response message is received for each of the channels.

16. The apparatus of claim 14, wherein the ASN-GW sends the RR request message only once for each of the channels, and sends the RR request messages as many times as a number of the channels.

17. The apparatus of claim 14, wherein the ASN-GW sends the RR request messages for each of the channels at the same time.

18. The apparatus of claim 14, wherein the BS performs the DSA process only once for each of the channels, and repeats the DSA process as many times as the number of the channels.

19. The apparatus of claim 14, wherein the BS performs the DSA processes for each of the channels in parallel.

20. The apparatus of claim 14, further comprising:
    the MCBCS server for, if an MCBCS service request message is received from a Mobile Station (MS), sending the MCBCS initialization request message to the ASN-GW for establishing data paths and MCBCS connections for each of the channels broadcast by the MCBCS server.

21. The apparatus of claim 20, wherein the MCBCS server, if the MCBCS initialization response message is received from the ASN-GW, sends content of each of the channels through the established data paths and MCBCS connections.

22. An apparatus for changing a MultiCast and BroadCast Service (MCBCS) broadcasting channel in an Access Service Network-Gateway (ASN-GW) of a Broadband Wireless Access (BWA) system, the apparatus comprising:
- means for, if an MCBCS initialization request message is received from an MCBCS server, sending a burst reservation request message for MCBCS burst allocation to one or more Base Stations (BSs) in a corresponding Multicast and Broadcast Service (MBS) zone; and
- means for, if a burst reservation response message is received from at least one of the one or more BSs, sending a Resource Reservation (RR) request message for each of the channels to the at least one of the one or more BSs for establishing data channels for each of the channels broadcast by the MCBCS server.

23. A method for changing a MultiCast and BroadCast Service (MCBCS) broadcasting channel in a Broadband Wireless Access (BWA) system, the method comprising:

- if an MCBCS initialization request message is received from an MCBCS server, sending a Resource Reservation (RR) request message by Access Service Network-Gateway (ASN-GW) to one or more Base Stations (BSs) in a corresponding Multicast and Broadcast Service (MBS) zone for establishing data paths for multiple channels broadcast by the MCBCS server, and sending a burst reservation request message for MCBCS burst allocation to the one or more BSs before sending the RR request message to the one or more BSs; and
- if the RR request message is received, performing a Dynamic Service Add (DSA) process for establishing an MCBCS connection for each of the channels by the one or more BSs.

* * * * *